United States Patent [19]
Johnson et al.

[11] Patent Number: 5,314,746
[45] Date of Patent: May 24, 1994

[54] SOFT, PUNCTURE- AND TEAR-RESISTANT POLYOLEFIN FILMS

[75] Inventors: Lisa K. Johnson, Mason; Paul E. Bowen, Loveland, both of Ohio; Thaddeus W. Klimek, Orland Park; Michael B. Edwards, Minooka, both of Ill.

[73] Assignee: Quantum Chemical Corporation, Cincinnati, Ohio

[21] Appl. No.: 975,485

[22] Filed: Nov. 12, 1992

[51] Int. Cl.$^5$ ............... B32B 27/08; C08F 297/08
[52] U.S. Cl. ............... 428/338; 428/516; 428/523; 525/240; 525/245
[58] Field of Search ............ 428/516, 338, 523; 525/240, 245

[56] References Cited

U.S. PATENT DOCUMENTS

| | | |
|---|---|---|
| 3,220,998 | 11/1965 | Berger . |
| 3,937,758 | 2/1976 | Castagna . |
| 4,048,412 | 9/1977 | Caumartin et al. . |
| 4,260,710 | 4/1981 | Staiger et al. . |
| 4,309,521 | 1/1982 | Sato et al. . |
| 4,311,807 | 1/1982 | McCullough, Jr. et al. . |
| 4,338,424 | 7/1982 | Morita et al. . |
| 4,454,299 | 6/1984 | Schweier et al. . |
| 4,455,405 | 6/1984 | Jaggard et al. . |
| 4,547,552 | 10/1985 | Toyota et al. . |
| 4,582,878 | 4/1986 | Chiba et al. . |
| 4,703,094 | 10/1987 | Raufast . |
| 4,739,015 | 4/1988 | Toyota et al. . |
| 4,740,421 | 4/1988 | Suzuki et al. . |
| 4,740,550 | 4/1988 | Foster . |
| 4,740,551 | 4/1988 | Foster . |
| 4,814,377 | 3/1989 | Joyce . |
| 4,820,775 | 4/1989 | Shiga et al. . |
| 4,882,380 | 11/1989 | Ficker et al. . |
| 4,902,483 | 2/1990 | Raufast . |
| 4,950,631 | 8/1990 | Buehler et al. . |
| 4,977,210 | 12/1990 | Kerth et al. . |
| 4,978,722 | 12/1990 | Goko et al. . |
| 5,006,600 | 4/1991 | Buechner et al. . |
| 5,034,365 | 7/1991 | Buehler et al. . |
| 5,037,789 | 8/1991 | Buehler et al. . |
| 5,047,468 | 9/1991 | Kiu et al. . |
| 5,051,388 | 9/1991 | Buehler et al. . |
| 5,104,949 | 4/1992 | Buehler et al. . |
| 5,126,398 | 6/1992 | Lee et al. . |
| 5,143,883 | 9/1992 | Buehler et al. . |
| 5,149,738 | 9/1992 | Lee et al. . |

FOREIGN PATENT DOCUMENTS

| | | |
|---|---|---|
| 0174863A2 | 3/1986 | European Pat. Off. . |
| 0225099A2 | 6/1987 | European Pat. Off. . |
| 442316A2 | 8/1991 | European Pat. Off. . |

OTHER PUBLICATIONS

Ross, J. F., et al., "An Improved Gas-Phase Polypropylene Process," *Ind. Eng. Chem.. Prod. Res. Dev.* (1985), 24: 149–154.

Randall, J. C., "A Review of High Resolution Liquid $^{13}$Carbon Nuclear Magnetic Resonance Characterizations of Ethylene-Based Polymers," *JMS-Rev. Macromol. Chem. Phys.*, C29 (2 & 3), 201–317 (1989).

W. Schoene, "PP Speciality Products for Film Applications," Speciality Plastics Conference, Zurich (Dec. 1989).

*Primary Examiner*—P. C. Sluby
*Attorney, Agent, or Firm*—Gerald A. Baracka; William A. Heidrich

[57] ABSTRACT

Tough, puncture- and tear-resistant films having a high degree of flexibility and softness are provided. The monolayer and multilayer films of the invention are obtained using copolymers of propylene with 8 to 40 weight percent ethylene produced by gas phase polymerization of the monomers in dual reactors. The films will have a 1% secant modulus from 5,000 psi to 70,000 psi. Melting points of these films are higher than that of low density polyethylene and, most generally, in the range 125° C. to 160° C.

11 Claims, 2 Drawing Sheets

1

SOFT, PUNCTURE- AND TEAR-RESISTANT POLYOLEFIN FILMS

BACKGROUND OF THE INVENTION

1. Field of the Invention

The present invention relates to polyolefin films having high melting points combined with improved flexibility, high puncture and tear resistance, and good contact clarity. The monolayer or multilayer films are produced using extrusion methods, either blown film extrusion, cast film extrusion, or lamination, and comprise a polyolefin which is a copolymer of propylene and ethylene.

2. Detailed Description of the Invention

Polyolefins are widely used for the production of films. These films can be produced by either blown extrusion or by slot-die extrusion with subsequent cooling using a chill roll or water bath and a variety of products with a range of properties are available.

The high melt point and highly crystalline structure of polypropylene make it well suited for applications where stiffer and strong films are required. The narrow melting range and high rate of crystallization do, however, create processing problems. To some extent these processing difficulties have been overcome by blending or by copolymerization but not without compromising optical properties, tensile strength, and other important film characteristics.

In a discussion of propylene polymers, W. Schoene in his article entitled "PP Specialty Film Products for Film Applications" (Specialty Plastics Conference 89, Zurich, 1989) divided propylene polymers into four classes—highly crystalline homopolymers, homopolymers with reduced crystallinity, random copolymers and impact copolymers. From the general properties listed by Schoene for the two copolymer types, it is apparent that clarity and stiffness are sacrificed in order to improve in the low temperature impact resistance.

Resins in the polyethylene homopolymer and copolymer families provide a broad spectrum of film products with their good optics, heat seal and processability. While these films are well suited for many uses, the low melting point of the resins precludes their use in certain applications.

It would be advantageous if polymers suitable for films were available which combine the advantages of both polypropylene and polyethylene resulting in films that display good contact clarity, sealing characteristics and softness with high impact and tear resistance. It would be even more desirable if these products had melting points substantially higher than that of low density polyethylene (LDPE) and preferably as high or higher than high density polyethylene (HDPE).

These and other advantages are achieved with the products of the instant invention which are described in more detail to follow.

SUMMARY OF THE INVENTION

The present invention relates to useful films having unique "hand" properties of softness and quietness, very high toughness and a melting point between that of polyethylene and polypropylene. The term hand, as employed herein, indicates that the films are soft and pliant with a cloth-like drape and feel. Toughness indicates resistance to puncture and tear. Also, where it is stated that the melting point is between polyethylene and polypropylene, it will be understood that the polyethylene referred to is LDPE and the polypropylene is highly isotactic propylene homopolymer.

The improved films of the present invention are produced from copolymers of propylene and ethylene obtained by copolymerizing the comonomers in two stirred-bed gas-phase reactors. The copolymers have processing characteristics which make them useful for the manufacture of both blown and cast films. The melting point of the copolymers, being between that of polyethylene and polypropylene, renders the films produced therefrom useful for a variety of applications.

More specifically, the films of the present invention are propylene-ethylene copolymer films having a 1% secant modulus from 5,000 psi to 70,000 psi and Elmendorf tear values greater than 100 grams per mil thickness in both MD and TD directions, said copolymer containing from 3 to 47 weight percent ethylene and having a melt flow from 0.01 to 500 dg/min and melting point from 115° to 160° C.

DETAILED DESCRIPTION OF THE INVENTION

Figure 1:
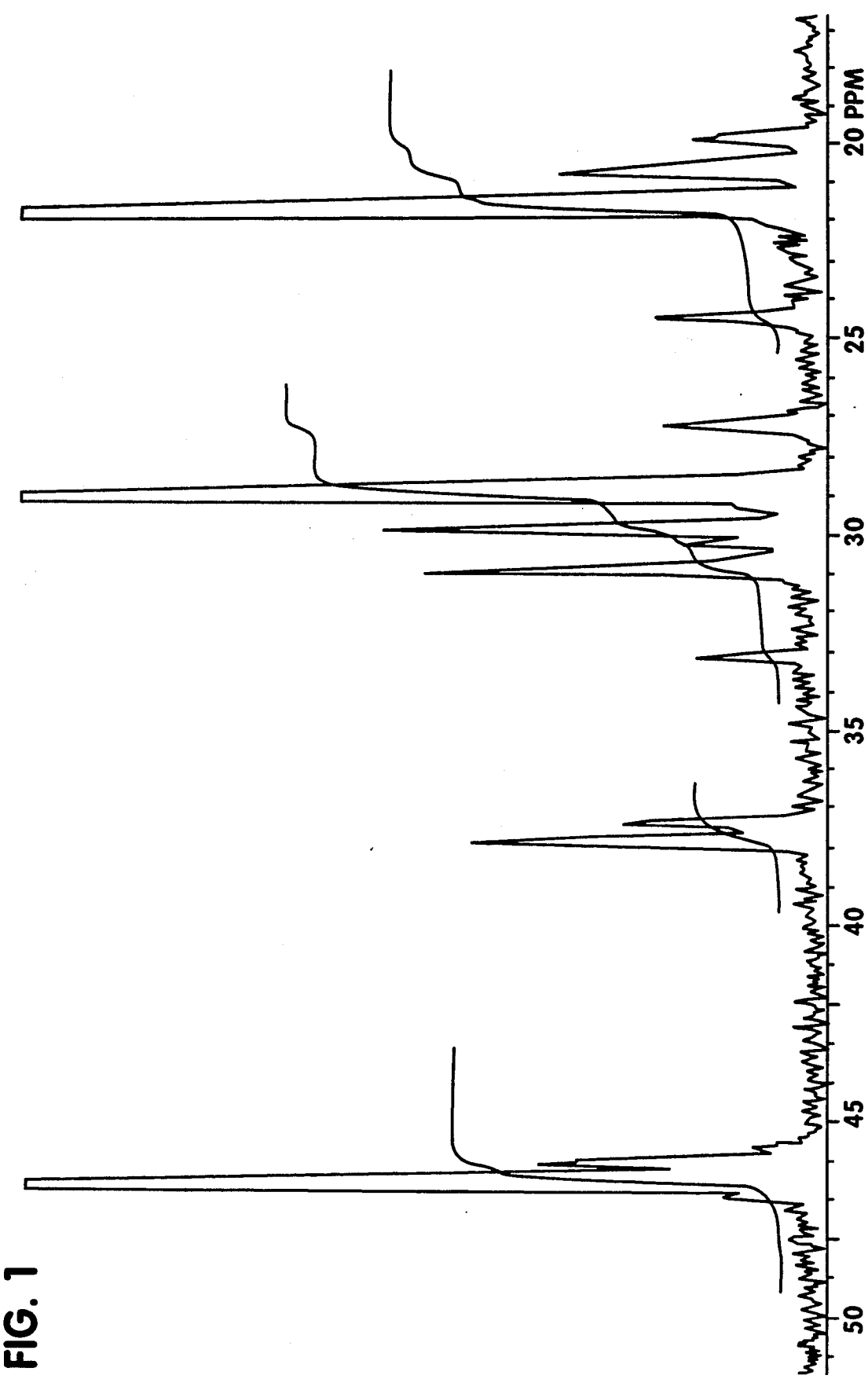
FIG. 1 is the $^{13}C$ NMR spectrum for a propylene-ethylene copolymer produced in accordance with the examples and used for the preparation of blown and cast films of the invention.

Copolymers employed to produce the films of the present invention are polymers of propylene with from 3 to 47 and, more preferably, 8 to 40 weight percent ethylene. Copolymers containing 0 to 91 weight percent propylene and 9 to 20 weight percent ethylene have been found to be particularly useful. The melting point of these copolymers generally ranges from typical melting points range from 125° C. to 160° C. Especially useful copolymers for the invention have melting points from 130° C. to 155° C.

More specifically, the copolymers are an intimate mixture of a semi-crystalline propylene-ethylene copolymer, containing from 0.5 to 12 weight percent ethylene, and a rubber-like propylene-ethylene copolymer, containing from 2.5 to 35 weight percent ethylene. These copolymers are respectively produced in first (primary) and second (secondary) polymerization vessels which are connected in series so that the polymer produced in the first reactor is passed to the second reactor and present during the polymerization which occurs therein. In a highly useful embodiment of the invention, 3 to 10 weight percent ethylene is polymerized in the primary reactor with 5 to 30 weight percent ethylene being polymerized in the second reactor.

It is most advantageous to conduct both polymerizations in the gas phase; however, either the first or second reactor may be operated in a mode other than gas phase. In the first reactor, propylene is copolymerized with a minor amount of ethylene at a temperature from 50° C. to 100° C. and pressure from 250 psig to 650 psig utilizing a titanium catalyst and an organoaluminum cocatalyst. More preferably, the temperature in the first reactor will be from 50° C. to 90° C. and the pressure will range from 300 psig to 450 psig.

The semi-crystalline copolymer of propylene and ethylene, referred to as the first copolymer, produced in the first reactor is directly fed to a second reactor which is maintained at 25° C. to 80° C. and 100 to 500 psi where additional propylene and ethylene are copolymerized in the presence of the first copolymer. The amount of ethylene employed in the second reactor is higher than employed in the first reactor in order to produce a copolymer of propylene and ethylene with rubber-like characteristics. Polymerization in the second reactor is generally accomplished without additional catalyst; however, it may be advantageous, to introduce more catalyst to the second reactor. If more catalyst is employed, it can be the same as the catalyst used in the first polymerization or different. Preferably, the second polymerization reactor is operated at 40° C. to 70° C. and 100 psig to 350 psig.

The use of dual or cascading reactors for the copolymerization of propylene and ethylene is known. Similarly, gas-phase polymerizations utilizing stirred, fixed beds comprised of small polymer particles are also known. For additional information regarding gas-phase polymerizations and a schematic flow diagram of the process, reference may be made to the article by Ross, et al., in *Ind. Eng. Chem. Prod. Res. Dev.*, 1985, 24: 149-154.

Highly active titanium catalyst activated by contact with an organoaluminum cocatalyst are used for these polymerizations. The polymerizations are carried out in the substantial absence of liquid reaction medium and gas velocity within the stirred-bed is maintained below the onset of fluidization. Depending on the compositional makeup of the gas phase, the gases can be recirculated through external heat exchangers for cooling or they can be partially condensed. Cooled monomer is recirculated into the reactor and provides thermal control. Recirculated monomer vaporizes when introduced into the reactor so that polymerization occurs in the gas phase. In the preferred mode of operation, i.e., stirred, fixed-bed gas phase, the primary and secondary reactors are equipped with spiral agitators to maintain a turbulent mechanically fluidized bed of polymer powder and prevent agglomeration.

Each reactor typically has its own control system(s) and is capable of independent operation. Means are usually provided to individually meter the propylene, ethylene, hydrogen for molecular weight control, catalyst and cocatalyst. This makes it possible to control and maintain the reactor conditions. If desired, monomer may be injected into the recirculated gas stream for introduction into the system.

Introduction of semi-crystalline copolymer produced in the first reactor into the second reactor is facilitated by operating the primary reactor at a somewhat higher pressure than that maintained in the secondary reactor. Propylene, ethylene and hydrogen, as required, are metered into the second reactor so that ethylene and propylene are copolymerized in intimate admixture with the first copolymer. In usual practice, there is sufficient residual catalyst with the first polymer to bring about polymerization in the second reactor and no further catalyst addition is required. Under certain circumstances, however, it may be advantageous to add additional catalyst/cocatalyst which can be the same or different as that used in the first reactor.

Hydrogen is generally included in both reactors for control of molecular weight. The amount of hydrogen can range from 0.1 up to about 10 mole percent. More typically, hydrogen levels range from 0.1 to 5 mole percent in the primary reactor and from 1 to 10 mole percent in the secondary reactor.

Small amounts of known modifiers or inhibitors may also be included in these polymerizations. These can include compounds such as oxygen, carbon monoxide, carbon dioxide, sulfur dioxide, glycol ethers, aliphatic and aromatic alcohols, carboxylic acids, sulfonic acids, water, and primary or secondary amines. The use of compounds of this type are disclosed in U.S. Pat. No. 4,739,015 and European Patent Application 86308952.0, published Jun. 10, 1987, Publication No. 0225099 and reference may be had thereto for additional detail.

To effect polymerization of propylene and ethylene, a high activity Ziegler-Natta catalyst comprised of a titanium-containing catalyst component and organoaluminum cocatalyst component is necessarily employed. Such catalysts are known and are referred to herein as Ti/Al catalysts. These may include additional components, such as a support, modifying compound(s), magnesium and other metal compound(s), and electron donating compound(s), and the like.

Ti/Al catalyst systems used may be unsupported or they may be associated with conventional support materials. When supported, the support may be treated prior to incorporation of the titanium component. Conventional inorganic materials, such as silica, alumina, magnesium chloride, magnesium oxide, magnesium hydroxide and the like, can be used as supports.

Ti/Al catalysts used for the gas-phase process of the invention are high activity catalysts, that is, they are capable of producing more than 5000 grams copolymer per gram of catalyst. In a more preferred embodiment, Ti/Al catalysts capable of producing 7000 grams or more copolymer per gram of catalyst are used. The amount of supported catalyst used is generally such that residual Ti contents in the copolymer are less than 10 ppm and, more preferably, below 5 ppm. With unsupported catalysts, the amount of catalyst used is such that residual Ti is less than 55 ppm and, more preferably, less than 40 ppm. Useful Ti/Al catalysts which can be employed for the process are described in U.S. Pat. Nos. 4,260,710; 4,309,521; 4,454,299; 4,547,552; 4,739,015; 4,814,377; 4,820,775 and 5,037,789.

In a particularly useful embodiment, highly active supported Ti/Al catalysts wherein the support is treated to remove or react surface hydroxyl groups prior to contacting with the titanium-containing compound are employed. Such pre-treatment or reaction of the support with a variety of materials makes it possible to produce catalyst which possess high activity for the polymerization of olefins in gas-phase processes. Such catalysts and their use for the homopolymerization of propylene are described in U.S. Pat. Nos. 4,950,631; 5,034,365; 5,051,388; 5,104,949 and 5,143,883 which are incorporated herein by reference.

One preferred supported catalysts of the above type useful for the preparation of the propylene-ethylene copolymers in accordance with the invention, referred to as embodiment I, is obtained by: (a) treating silica to remove surface hydroxyl groups by calcining said silica in an inert atmosphere and treating with a hexaalkyl disilazane; (b) contacting said treated silica with (1) a modifying compound selected from the group consisting of silicon halides, boron halides, aluminum halides, alkyl silicon halides and mixtures thereof; and (2) at least one hydrocarbon soluble magnesium-containing compound selected from the group consisting of hydrocarbyloxy magnesiums, hydrocarbyloxymagnesium halides and mixtures thereof; said contacting steps (1) and (2) occurring in random order; (c) contacting said product of step (b) with at least one titanium-containing compound having the structural formula Ti(OR)$_n$X$_m$, where R is aryl, alkyl or mixtures thereof; X is halogen; n is an integer of 1 to 4; m is 0 or an integer of 1 to 3; and the sum of m and n is 4; and (d) treating the product of step (c) with a titanium-containing compound having the structural formula TiX$^1_p$(OR$^1$)$_z$, where X$^1$ is halogen; R$^1$ is aryl or alkyl; p is an integer 1 to 4; q is 0 or an integer of 1 to 3; and the sum of p and q is 4, with the proviso that the titanium-containing compound of this step is not the same as the titanium-containing compound of step (c) Supported catalysts of this type are described in U.S. Pat. No. 4,950,631 which is incorporated herein by reference.

In another preferred embodiment (embodiment II), the catalyst is obtained by treating silica to remove surface hydroxyl groups by calcining in an inert atmosphere and treating with a hexaalkyl disilazane and reacting said modified silica support having a selective distribution of reactive hydroxyl groups with a magnesium compound reactive with said surface hydroxyl groups, optionally reacting the thus obtained product with a silicon halide, alkyl silicon halide, boron halide or aluminum halide, further reacting the so-produced first material with a tetra-substituted organo halogen-free titanium compound wherein the organic moiety sterically hinders accessibility of said organo titanium compound to the reactive sites on the modified silica support and thereafter reacting the so-produced second material with a titanium halide. Such catalysts are described in U.S. Pat. No. 5,143,883 which is incorporated herein by reference.

For yet another preferred embodiment (embodiment III), the catalyst is prepared by (a) contacting silica, in random order, with (1) at least one hydrocarbon soluble magnesium-containing compound; and (2) a first modifying compound selected from the group consisting of silicon halide; boron halides, aluminum halides and mixtures thereof followed by a second modifying compound selected from the group consisting of a silane of the formula SiH$_1$X$^2_s$, where X$_2$ is halogen; r is an integer of 1 to 3; and s is an integer of 1 to 3, with the proviso that the sum of r and s is 4, hydrogen halides having the structural formula HX$^3$, where X$^3$ is halogen, and mixtures thereof, said sequence of contact of silica with said components (1) and (2) being random; (b) contacting the product of step (a) with a first titanium-containing compound having the structural formula Ti(OR)$_m$X$_n$, where R is hydrocarbyl or cresyl; X is halogen; m is an integer of 1 to 4; and n is 0 or an integer of 1 to 3, with the proviso that the sum of m and n is 4; and (c) contacting the product of step (b) with a second titanium-containing compound having the structural formula TiX$^1_p$(OR$^1$)$_q$, where X$^1$ is halogen; R$^1$ is hydrocarbyl; p is an integer of 1 to 4; q is 0 or an integer of 1 to 3, with the provisos that the sum of p and q is 4 and that said first titanium-containing compound and said second titanium-containing compound are different. Catalysts of this type are described in U.S. Pat. No. 5,034,365 which is incorporated herein by reference.

For another preferred embodiment (embodiment IV), a highly useful catalyst is produced by (a) treating an inert inorganic support with hexamethyl disilazane to remove surface hydroxyl group and heating at 100°–150° C. for ½ to 3 hours; (b) contacting said treated inert inorganic support with a hydrocarbon soluble magnesium compound; (c) contacting said product of said step (b) with a modifying compound selected from the group consisting of silicon halides, boron halides, aluminum halides, hexaalkyl disilazanes and mixtures thereof; (d) contacting said product of said step (c) with a vanadium compound having the structural formula V(O)$_x$X$^1_{4-s}$, where X$^1$ is halogen; and s is 0 or 1; a first titanium-containing compound having the structural formula TiX$^3_p$(OR$^3$)$_q$, where X$^3$ is halogen; R$^3$ is hydrocarbyl; p is an integer of 1 to 4; and q is 0 or an integer of 1 to 3, with the proviso that the sum of p and q are 4 and, optionally, a second titanium-containing compound of the formula Ti(OR$^2$)$_n$X$^2_m$, where R$^2$ is hydrocarbyl; X$^2$ is halogen; n is an integer of 1 to 4; and m is 0 or an integer of 1 to 3 with the proviso that the sum of n and m is 4; and with the further proviso that if two titanium-containing compounds are used said first and said second titanium-containing compounds are not identical. These catalysts are described in U.S. Pat. No. 5,051,388 which is incorporated herein by reference.

A final preferred embodiment (embodiment V), utilizes a catalyst component obtained by (a) heating an inert inorganic support to a temperature of 100°–150° C. for ½ to 3 hours to remove surface hydroxyl groups; (b) contacting the treated inert inorganic compound with a hydrocarbon soluble magnesium compound; (c) contacting the product of said step (b) with a modifying compound selected from the group consisting of silicon halides, boron halides, aluminum halides, alkyl silicon halides, hexaalkyl disilazanes and mixtures thereof; and (d) contacting the product of said step (c) with a vanadium compound having the structural formula V(O$_2$)X$^1_{4-s}$, is halogen and s is 0 or 1; a first titanium-containing compound having the structural formula TiX$^3_p$(OR$^3$)$_q$, where X$^3$ is halogen, R$^3$ is hydrocarbyl, p is an integer of 1 to 4, and q is 0 or an integer of 1 to 3, with the proviso that the sum of p and q are 4 and, optionally, a second titanium-containing compound of the formula Ti(OR$^2$)$_n$X$^2_m$, where R$^2$ is hydrocarbyl, X$^2$ is halogen, n is an integer of 1 to 4, and m is 0 or an integer of 1 to 3 with the proviso that the sum of n and m is 4; and with the further proviso that if two titanium-containing compounds are used said first and said second titanium-containing compounds are not identical. The catalysts of this preferred embodiment are disclosed in U.S. Pat. No. 5,104,949 which is incorporated herein by reference.

All of the supported titanium catalyst components of the aforementioned preferred embodiments I–V are utilized with one or more cocatalysts in the polymerization process. At least one cocatalytic agent which is an organoaluminum compound and, more preferably, an aluminum alkyl or alkylaluminum halide is combined with the titanium component. Further advantages are realized with certain of titanium components if a second cocatalyst silane component is also present. Useful silanes are hydrocarbylalkoxysilanes and have the general formula R'$_a$(OR")$_{4-a}$ Si where R' and R" are the same or different hydrocarbyl groups.

A control parameter, referred to as Q$_c$, which is derived from selected integrated peak areas of the $^{13}$C NMR spectrum for propylene-ethylene copolymers is used to control the process. After acceptable limits are established for Q$_c$, the product produced in the second reactor is analyzed and the actual value of the parameter, referred to as Q$_A$, obtained. Q$_A$ is then compared with Q$_c$ to determine conformance/nonconformance and adjustments are made, as required, to the ethylene feed and, if necessary, other process variables to bring the $Q_A$ into conformance with the limits defined for $Q_c$.

It will be understood by those skilled in the art that, if the overall (total) pressure in the reactor(s) is maintained at the same level, any change in ethylene pressure resulting from adjustments to the ethylene feed will require a corresponding change in one or more of the other components present in the gas phase. A change in the partial pressure of ethylene will necessarily change the partial pressure of propylene, hydrogen and any other gas phase components at constant total pressure. The total pressure in the reactor may, on the other hand, be changed in response to changes in the amount of ethylene fed so that the partial pressures at the other gaseous components will remain unchanged.

The control parameter will be derived using all or some combination of the following $^{13}C$ NMR peaks for solutions of ethylene-propylene copolymers and generally accepted by the scientific and technical communities as corresponding to molecular structural features of these copolymers:

| CHEMICAL SHIFT (PPM) | ASSIGNMENT |
| --- | --- |
| 45.6–47.5 | $S_{\alpha\alpha}$ [CH$_2$ of PPP Triads] |
| 37.9 | $S_{\alpha\Gamma}$ [Ch$_2$ in PEP] |
| 37.5 | $S_{\alpha\delta}+$ [Ch$_2$ in EEEP and PEEP] |
| 33.2 | $T_{\Gamma\Gamma}+$ [CH in EPE] |
| 31.2–30.9 | $T_{\beta\Gamma}+$ [CH in PPE] |
| 30.4 | $S_{\Gamma\delta}+$ [CH$_2$ in PEEP] |
| 30.0 | $S_{\delta\delta}+$ [CH$_2$ in EEEE] |
| 29.0–28.4 | $T_{\beta\beta}$ [CH in PPP] |
| 27.4 | $S_{\beta\Gamma}+$ [CH$_2$ in EEEP and PEEP] |
| 24.9 | $S_{\beta\beta}$ [CH$_2$ in PEP] |
| 21.6–19.5 | P [CH$_3$ in all P Triads] |

Information regarding the use of these $^{13}C$ NMR peak areas for the calculation of composition and monomer sequence distributions in copolymers are discussed in the text of J.C. Randall, *Polymer Sequence Determination*, Academic Press (1977) and the paper by the same author in *JMS—Rev. Macromol Chem. Phys.*, C29 (2 and 3), 201-317 (1989). These determinations will, of course, depend on the accuracy of the individual integrals and resolution of the peaks in the spectrum.

Preferably, the control parameter $Q_c$ is derived from the eight integral regions of the $^{13}C$ NMR spectrum in accordance with the equation $$Q_c = \frac{A}{B}$$

wherein
$A = 1.167R_1 + 0.75R_2 + 1.5R_3 + 1.5R_4 + 1.167R_8$
$B = 0.667R_1 + 0.5R_2 + R_5 + R_6 + R_7 + 0.667R_8$
where $R_1$ through $R_8$ correspond to the following chemical shifts: $R_1$ 37.9 PPM; $R_2$ 37.5 PPM; $R_3$ 33.2 PPM; $R_4$ 31.2–30.9 PPM; $R_5$ 30.4 PPM; $R_6$ 30.0 PPM; $R_7$ 27.4 PPM and $R_8$ 24.9 PPM. In identifying and resolving the aforementioned peak areas, the methyl peak due to isotactic PPPPP pentads is used as a chemical shift reference line and is set to 21.78 PPM.

When $Q_c$ conforms to the above definition, the defined limits for $Q_c$ in the process will range from 0.90 to 1.35 and, more preferably, from 0.95 to 1.30. In the event the actual value $Q_A$ obtained drops below the 0.90 minimum limit, the ethylene feed to the primary reactor is increased and/or the ethylene feed to the secondary reactor is decreased. Adjusting the ethylene feed will change the ratio of the partial pressures of the gaseous components in the reactor. Other process conditions and feed rates may but are not necessarily changed to bring the system, i.e., process and copolymer composition, into conformance. When $Q_A$ exceeds the maximum permissible limit of 1.35, ethylene to the primary reactor is reduced and/or the ethylene feed to the secondary reactor is increased.

Copolymers produced in accordance with processes of the type described have a desirable balance of useful properties but, most notably, have improved softness and a melting point between polyethylene and polypropylene. While melt flow rates of these copolymers can range from 0.01 up to 500, they more commonly range from 0.1 to 100. It is even more advantageous if the copolymer melt flow rates are from 0.2 to 40. Flexural modulii of the copolymers can range from 100,000 psi to as low as 20,000 psi but, more preferably, will be from 40,000 psi to 70,000 psi.

Films produced from the above described propyleneethylene copolymers have a 1% secant modulus from 5,000 psi to 70,000 psi and, more preferably, from 15,000 psi to 65,000 psi. Especially useful films which are very flexible and have a soft feel have a 1% secant modulus from 25,000 psi to 60,000 psi. Even though they posses a high degree of softness and flexibility, the films are tough and resist tear and puncture. The films typically have Elmendorf tear values greater than 100 grams per mil thickness in both the MD and TD directions. For cast films, Elmendorf tear values are generally greater than 200 grams per mil in the MD direction. For blown films Elmendorf tear values are generally greater than 120 grams per mil in both the MD and TD directions.

Other general features of the soft copolymers include: processability in both monolayer and coextrusion in blown and cast film applications, unique hand properties and very high toughness. Compared to homopolymer and conventional random copolymers of propylene, the copolymers of the invention have better room and low temperature impact strength and lower modulus. When compared to the so-called impact propylene polymer films, advantages of the present products include: lower modulus, much higher tear strength, bruise resistance, better room and low temperature impact strength and good contact clarity with similar haze. While certain resins in the polyethylene homopolymer and copolymer families could have similar hand properties and physical properties, the melting points of these resins would be significantly lower than that of the present copolymers. It will be apparent from the foregoing that the films made with the propylene-ethylene copolymers of the invention will have a balance of properties heretofore not possible. It is even more advantageous that these properties are obtained from a reactor produced copolymer without the need for further blending or processing to achieve the desired softness/impact balance.

The copolymers of the present invention are readily processable and are suitable for the preparation of either blown or cast film using available equipment and processing conditions. The term film, as employed herein, is intended to encompass both films and sheets even though conventional practice in the industry considers products with thickness of 10 and below to be films and products with thicknesses above 10 mils to be sheeting. Conventional continuous blown film processes whereby a molten cylinder of thermoplastic resin is simultaneously axially drawn and radially expanded can be used. In these processes the hot tubular extrudate exiting the annular die is cooled by air from an air ring on the outside of the tube. Cooling is sometimes applied to the inside of the tube as well. The copolymers of the invention may be processed utilizing either horizontal or vertical blown film configurations.

Conventional casting procedures may also be employed to produce the improved films of the invention. In these operations, the thermoplastic material is melted and continuously extruded through a slot die, typically onto a chill roll where it is quenched and solidified. The film is stripped from the chill roll and wound. The film may be further processed, e.g., electrostatically treated to modify surface characteristics or oriented in one or both directions to improve physical properties. Biaxial orientation requires that the film be stretched longitudinally in the machine direction and across the film in the transverse direction. Stretching in this manner modifies the molecular orientation of the film and produces products having higher tensile and impact strength. The general appearance and clarity of the film may also be improved.

The application for which the film will be used will generally dictate whether the film will be produced by blowing or casting. Since cast film typically has less gauge variation and better clarity, casting procedures will be employed where these properties are important considerations for the application involved. Whereas blown film gauge can vary as much as ±7-10%, average gauge variation of cast film is generally about one-half that and can even be lower with judicious control of process parameters. The ability for better control of cooling in casting operations also make it possible to achieve relatively low crystallinity with a resultant improvement in film clarity. On the other hand, blown film is generally considered to have an edge where strength is a factor. Unless oriented, cast film generally has strength only in the machine direction.

Based on the unique properties of the present copolymers, it is anticipated that films produced therefrom may be utilized in applications where other polyolefins and flexible polymers are presently employed. Possible uses for the film products of the invention include: atmospheric balloons, grocery bags, typewriter ribbons, geo membranes, health care films, biohazard bags, surgical drapes, disposable garments, diaper liners, intravenous solution bag overwraps, meat wraps, microwave bags, boil-in bags, inflatable toys, automotive masking tape, frozen food packaging, agricultural films, construction films, polymer and paper coatings and laminations, refuse bags, liner films and the like.

The present copolymer products may be utilized as a monolayer film or they may constitute one or more layers of a multilayer film construction. In the latter applications, the films of the invention can be associated with one or more film layers of the same or different polymer. The copolymer films may constitute the outside layer of a multilayer construction or it may be positioned between two or more layers of the same or different polymer. Illustrative of the various materials which can be layered with the copolymer film, are nylon, polyvinyl chloride (PVC), polyvinylidene chloride (PVDC), high density polyethylene (HDPE), low density polyethylene (LDPE), linear low density polyethylene (LLDPE), ethylene-vinyl acetate copolymer (EVA), ethylene-n-butyl acrylate copolymer (EnBA), hydrolyzed ethylene-vinyl acetate copolymer (EVOH), and the like.

The multilayer film constructions can be produced by known methods including blown and cast film coextrusion, dry lamination and extrusion lamination. It is generally not necessary to use an adhesive to adhere the copolymer layer to the other film layers but an adhesive layer, commonly referred to as a tie layer, may be employed with certain substrates to increase interlayer adhesion. Conventional tie layers known to the art can be employed for this purpose.

The following examples illustrate the invention more fully and are not intended to be limiting. Variations on the procedures described will be apparent to those skilled in the art and are intended to be within the scope of the invention. All parts and percentages in the examples are given on a weight basis unless otherwise indicated.

Data reported in the examples and comparative examples were obtained using the following procedures:
 (1) Tensile and elongation properties—ASTM D 882
 (2) 1% Secant Modulus—ASTM D 882
 (3) Tear (Elmendorf)—ASTM D 1922
 (4) Total Energy Dart Drop (TEDD) and Dart Drop Impact—ASTM 4272
 (5) Energy Absorbing Impact (EAIT)—determined using a Model 4092 energy absorption impact tester from Kayeness Inc. in accordance with the manufacturers procedure manual.
 (6) Puncture—determined using an Instron machine in accordance with the standard procedure.

Preparation of Titanium Catalyst Component

Thirty pounds hexamethyldisilazane-treated silica (Crossfield EP-10) containing 4% carbon by analysis on silica was charged to a vessel and heated for 8 hours with a nitrogen purge while heating at a temperature of 138°-149° C. The treated silica was cooled to 26.5° C. 30 psi $N_2$ and 89 lbs 12 oz. 2-methyl-1-pentyloxymagnesium chloride added with stirring. The mixture was heated. at 90.5° C. under a nitrogen purge for 2-3 hours and then cooled to 35° C. under 15 psi $N_2$. Heptane (150 lbs) and 65 lbs 4 oz. silicon tetrachloride solution (35 wt. % in heptane) were then added. The $SiCl_4$ was added at a rate of 10 lbs per io minutes. When the addition was complete, the mixture was heated to 48.9°-54.4° C. and maintained for 1 hour. The mixture was then cooled and the solids permitted to settle for 2 hours. The bulk of the liquid was siphoned off and 150 lbs fresh heptane added with stirring for 15 minutes. This mixture was permitted to settle for 2 hours and the siphoning repeated. Heptane (170 lbs) was again added while stirring followed by the addition of 19 lbs 1 oz. titanium cresylate solution (40% in heptane) and then 109 lbs titanium tetrachloride. The mixture was heated and maintained at 100°±12° C. for 2 hours. After cooling to below 88° C., 200 lbs heptane was added and agitation was stopped. The reactor was cooled to below 65° C. and the mixture allowed to settle for 2 hours. The liquid was siphoned off and 200 ml fresh heptane added followed by stirring for 15 minutes and 1 hour settling. This washing procedure was repeated 4 more times. The catalyst was then dried at 99°±12° C. with a nitrogen purge until all the heptane was removed. The product was analyzed by x-ray fluorescence and found to contain 2.28% Ti, 3.84% Mg, 46.8% Si and 15% Cl.

Polymerization of Propylene and Ethylene

Two conventional 800 liter gas-phase polymerization reactors, each equipped with an agitator to maintain turbulent mechanical fluidization of the polymer powder within, were connected so that polymer exiting the first (primary) reactor was introduced into the second (secondary) reactor. Ethylene and propylene were continuously metered at controlled rates to the first reactor which was maintained at 76.5° C. and 350 psig. A hydrogen feed rate of 0.18 SCFH was maintained to the primary reactor and the above-prepared titanium catalyst and two cocatalysts were also independently metered. The first cocatalyst was triethylaluminum which was introduced as a 25% solution in heptane. The second cocatalyst, isobutyltrimethoxysilane, was introduced as a 15% solution in heptane. The catalyst and cocatalyst agents were fed at rates to maintain a triethylaluminum/silane/titanium ratio of 120/16/1.

Ethylene and propylene were also continuously metered at controlled rates to the second reactor. The secondary reactor was operated at 51.6° C. and 200 psig. Hydrogen was metered at a rate of 5.45 SCFR. Alcohol was introduced to the second reactor at a feed rate of 115 gms/hr to control reaction rate. No catalyst or cocatalyst was added to the second reactor.

For this polymerization, a control value in the mid-range of the defined limits for the $Q_c$ parameter developed for propylene-ethylene copolymers was selected and the feed rates of propylene and ethylene into the primary and secondary reactors were 10 maintained to achieve and maintain this selected control value. Specifically, ethylene was fed at a rate of 17 lbs/hr to the primary reactor and the feed rate of propylene into the primary reactor was 281 lbs/hr. The feed rates of propylene and ethylene to the secondary reactor were 32 lbs/hr and 31.5 lbs/hrs., respectively. Under these operating conditions the actual value, $Q_A$, obtained for the copolymer produced under steady state conditions was 1.14. This value was determined based on $^{13}C$ NMR analysis of the resulting copolymer product in accordance with the equation $Q=A/B$ where A and B are as previously defined and derived from the identical peak areas $R_1$-$R_8$ obtained from the $^{13}C$ NMR spectrum of the copolymer. FIG. 1 shows the uC NMR spectrum of the copolymer with the integrated peak areas.

The copolymer was extruded and pelletized. Conventional additives were incorporated during this processing. The copolymer contained 13.5 weight percent ethylene and elemental analysis of the copolymer showed it to contain 3.5 ppm Ti; 272 ppm Al; 26 ppm Cl; 77 ppm Si; 100 ppm Ca; and 71 ppm P. It was an intimate mixture of semi-crystalline random propylene-ethylene copolymer produced in the first reactor containing 3.5 percent ethylene and the rubber-like propylene-ethylene copolymer produced in the secondary reactor which contained 10 percent ethylene.

Figure 2:
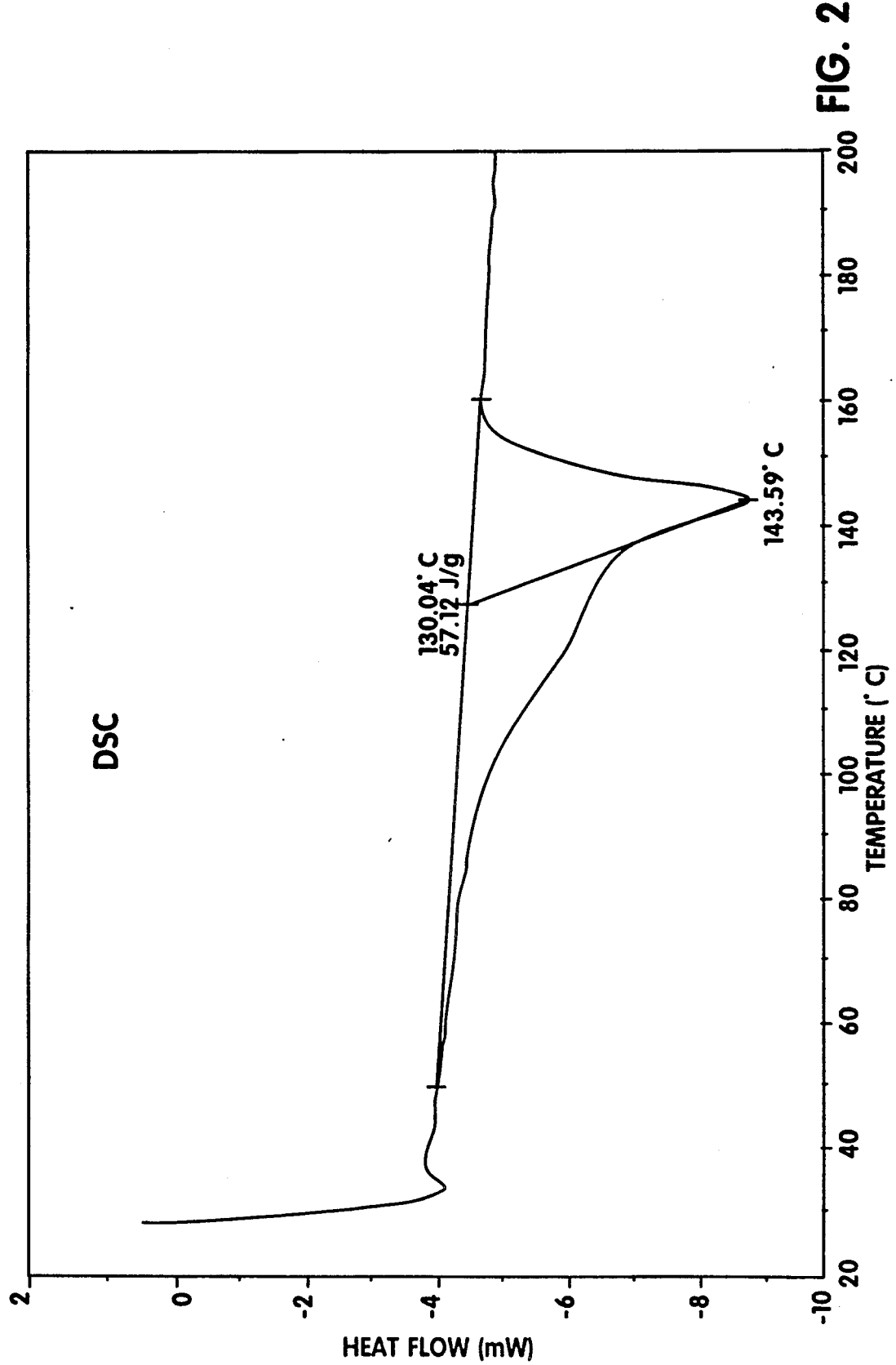
FIG. 2 is a DSC (Differential Scanning Calorimeter) Plot obtained for a propylene-ethylene copolymer produced in accordance with the examples having a melting temperature of 143.59° C. and used for the preparation of blown and cast films of the invention.

The copolymer had a melt flow rate of 1.0 dg/min., DSC peak melt temperature of 143.6° C. and heat of fusion (DSC) of 13.67 cal/g. FIG. 2 shows the DSC profile obtained for the copolymer with only one peak at 143.6° C. The secondary peak usually observed with heretofore known copolymers of this type in the range 115°-125° C. is absent. The flexural modulus (ASTM D790B) of the product was 51400 psi.

EXAMPLE I AND COMPARATIVE EXAMPLE A

Two mil blown film was produced using the above-prepared copolymer. For comparison, film was also blown from a commercial impact copolymer having a comparable ethylene content produced using the conventional procedure of homopolymerizing propylene in a first reactor and then, in a second reactor, copolymerizing ethylene and propylene in the presence of the polypropylene from the first reactor. The commercial impact copolymer had a melt flow rate of 0.7 and flexural modulus of 115000 psi.

To produce the blown films, a small sample blown film line was employed. The line used a 1.5 inch Johnson 24:1 L/D water cooled extruder with 25 HP drive. The die used was a 4 inch diameter GEC spider design. Extrusion conditions and properties of the films produced from the copolymer and comparative resin were as follows:

|  | EXAMPLE I | COMPARATIVE EXAMPLE A |
|---|---|---|
| OPERATING CONDITIONS: |  |  |
| BUR | 2.2:1 | 2.2:1 |
| Lay-Flat Width (in.) | 14 | 14 |
| Temperatures (°F.) | 450 | 450 |
| Zone 1 Barrel | 450 | 450 |
| Zone 2 Barrel | 450 | 450 |
| Zone 3 Barrel | 450 | 450 |
| Zone 4 Adapter | 450 | 450 |
| Zone 5 Block | 450 | 450 |
| Zone 6 Bottom Die | 450 | 450 |
| Zone 7 Top Die | 460 | 460 |
| Drive Power (Amps) | 8 | 8 |
| Volts | 145 | 200 |
| Screw RPM | 76 | 108 |
| Adapter Pressure (psi) | 4000 | 4500 |
| Melt Temperature (°F.) | 475 | 485 |
| FILM PROPERTIES: |  |  |
| Yield (psi) |  |  |
| MD | 2280 | 3686 |
| TD | 2272 | 3186 |
| Break (psi) |  |  |
| MD | 6712 | 9317 |
| TD | 6399 | 6122 |
| Elongation at Yield (%) |  |  |
| MD | 8.9 | 13.9 |
| TD | 8.9 | 6.0 |
| Elongation at Break (%) |  |  |
| MD | 663 | 711 |
| TD | 678 | 667 |
| 1% Secant Modulus (Mpsi) |  |  |
| MD | 59 | 128 |
| TD | 53 | 118 |
| TEDD (ft-lbs) |  |  |
| Flat | no break | 1.55 |
| Creased | no break | 1.26 |
| Elmendorf Tear (g) |  |  |
| MD | 300 | 37 |
| TD | 460 | 132 |

The advantages of films produced using the copolymer of the invention are apparent from the above data. While the films have comparable tensile and elongation properties, the film of the invention has significantly lower modulus indicating a much softer product than the film produced from the comparative resin. Furthermore, the strength of the film of Example I is also much higher than that of the comparative film as evidenced by the improved TEDD results. Resistance to tear in both directions is also markedly superior with the copolymer films of the invention and the balance between the MD and TD tear values is considered to be better.

EXAMPLE II AND COMPARATIVE EXAMPLE B

A cast film was prepared utilizing the copolymer prepared in accordance with the previously described procedure. An Egan extruder having a 2.5 inch diameter screw, 24:1 L/D and 22 inch die with 22 mil die gap was used. A film was also cast utilizing a conventional copolymer resin produced by homopolymerizing propylene in the first reactor and copolymerizing propylene and ethylene in the second reactor in the presence of the homopolymer from the first reactor. The ethylene content of the comparative resin was essentially identical to that of the copolymer of the invention; however, the melt flow rate was 2.1. Conditions employed for the cast film line were as follows:

| | |
|---|---|
| Screw Speed | 50.4 rpm |
| Amps | 38 |
| Line Speed | 96 fpm |
| Barrel Pressure | 1170 psi |
| Pipe Pressure | 770 psi |
| Pipe Melt Temp. | 435° F. |
| Adapter Melt Temp. | 470° F. |
| Chill Roll Temp. (#1) | 60° F. |
| Chill Roll Temp. (#2) | 60° F. |

Films produced with the copolymer of the invention and the comparative copolymer resin were evaluated and film properties were as follows:

| | EXAMPLE II | COMPARATIVE EXAMPLE B |
|---|---|---|
| Yield (psi) | | |
| MD | 1730 | 2010 |
| TD | 1470 | 1690 |
| Break (psi) | | |
| MD | 5290 | 4280 |
| TD | 3630 | 3250 |
| Elongation at Yield (%) | | |
| MD | 9 | 5 |
| TD | 9 | 3 |
| Elongation at Break (%) | | |
| MD | 520 | 470 |
| TD | 590 | 540 |
| 1% Secant Modulus (psi) | | |
| MD | 35600 | 49800 |
| TD | 27800 | 43900 |
| TEDD (ft-lbs) | | |
| Flat | 6.6 | 1.9 |
| Creased | 6.4 | 1.8 |
| Elmendorff Tear (g) | | |
| MD | 270 | 110 |
| TD | 860 | 460 |
| Dart Drop Impact (g) | 1204 | 541 |
| Puncture Force (N) | 30.5 | 25.1 |
| EAIT Force (lb @ 23° C.) | 13.4 | 10.5 |
| Deformation (in) | 2.45 | 1.94 |

-continued

| | EXAMPLE II | COMPARATIVE EXAMPLE B |
|---|---|---|
| EAIT Force (lb @ −18° C.) | 12.0 | 8.7 |
| Deformation (in) | 0.41 | 0.54 |
| Film Thickness (mils) | | |
| Min. | 1.25 | 0.65 |
| Max. | 1.46 | 1.49 |
| Avg. | 1.35 | 1.00 |
| Std. Dev. | 0.03 | 0.27 |

It is apparent from the above data that, for cast films of comparable thickness, the tensile and elongation properties of the film of the invention and the film produced with the conventional copolymer are very similar. However, the films produced from the copolymer resin of the invention are significantly softer as evidenced by their lower modulus values. Impact strength, as determined by the TEDD, Dart Drop, EAIT tests, is also significantly higher for the films prepared with the copolymer of the invention. Much improved tear, in both directions, is achieved with the copolymer films of the invention.

We claim:

1. A puncture-resistant propylene-ethylene copolymer film having a 1% secant modulus from 5,000 psi to 70,000 psi and Elmendorf tear value greater than 100 grams per mil thickness in both the machine direction and the transverse direction, said copolymer containing from 3 to 47 weight percent ethylene and having a melt flow from 0.01 to 500 dg/min and melting point from 115° C. to 160° C.

2. The film of claim 1 wherein the copolymer contains 8 to 40 weight percent ethylene and has a melt flow rate from 0.1 to 100 dg/min and a melting point from 125° C. to 160° C.

3. The film of claim 2 wherein there is a substantial absence of a secondary peak in the Differential Scanning Calorimeter profile of the copolymer in the range 115° C. to 125° C.

4. The film of claim 2 having a 1% secant modulus from 15,000 psi to 65,000 psi.

5. The film of claim 4 wherein the copolymer contains from 9 to 20 weight percent ethylene.

6. The film of claim 5 which is a blown film having an elmendorf tear value greater than 120 grams per mil thickness in both the machine direction and transverse direction.

7. The film of claim 6 having a 1% secant modulus from 25,000 psi to 60,000 psi.

8. The film of claim 7 wherein the copolymer has a melt flow rate from 0.2 to 40 dg/min and melting point from 130° C. to 155° C.

9. The film of claim 5 which is a cast film having an elmendorf tear value greater than 200 grams per mil thickness in the machine direction.

10. The film of claim 9 having a 1% secant modulus from 25,000 psi to 6,000 psi.

11. The film of claim 10 wherein the copolymer has a melt flow rate from 0.2 to 40 dg/min and melting point from 130° C. to 155° C.

* * * * *